Dec. 13, 1960 F. A. MASSE 2,964,438
MASKING PAPER
Filed Dec. 18, 1956
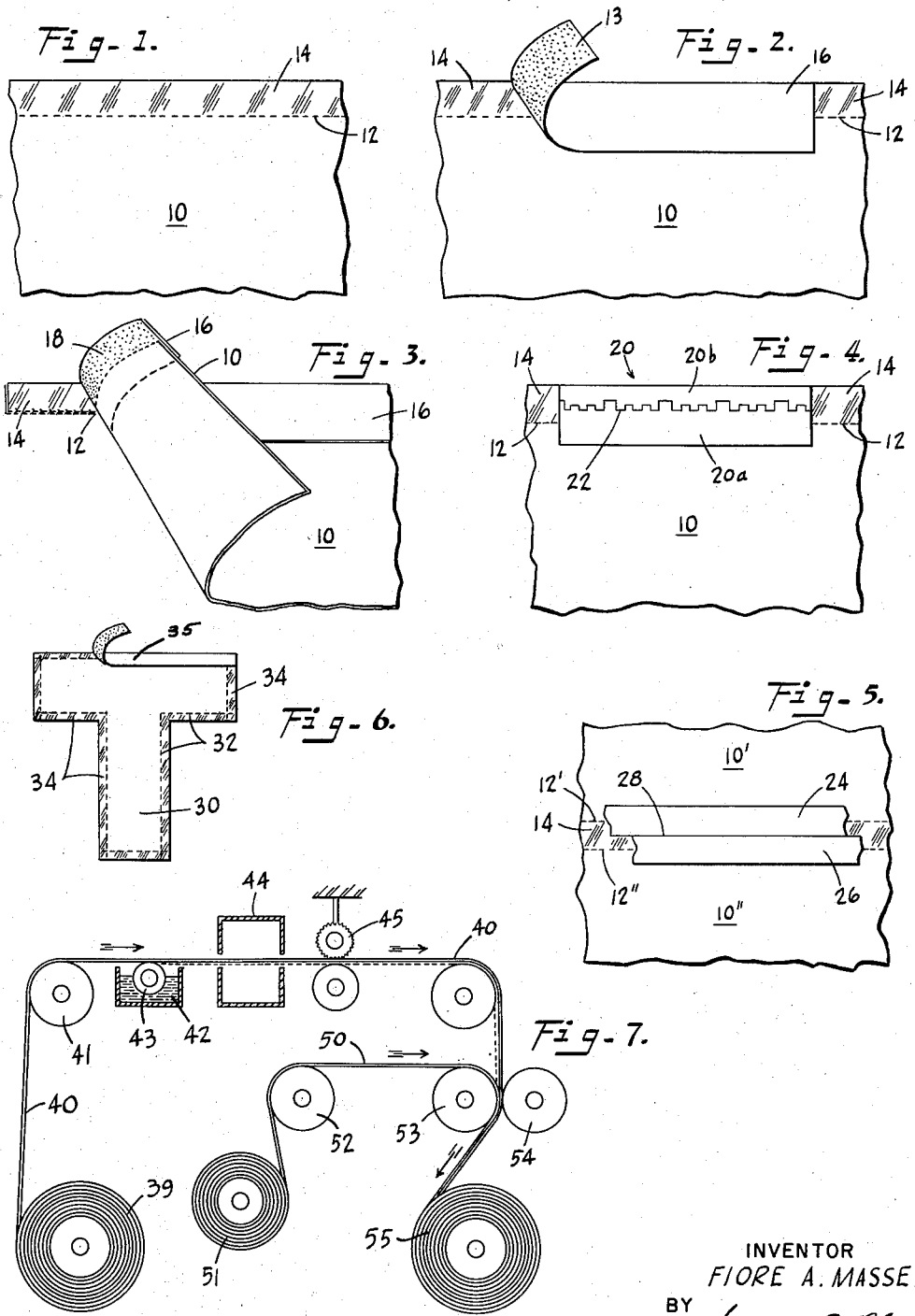
INVENTOR
FIORE A. MASSE
BY
Spencer E. Olson
ATTORNEY

2,964,438

MASKING PAPER

Fiore A. Masse, Boston, Mass.
(83 Autumn St., Malden, Mass.)

Filed Dec. 18, 1956, Ser. No. 629,061

8 Claims. (Cl. 154—53.5)

This invention relates in general to masking materials and more particularly to a new form of masking paper and article of manufacture utilizing the same.

Preparatory to the two-tone painting of a surface, for example an automobile or a bordered wall, a sheet of masking paper is cut to the size and shape of the area to be masked, and strips of adhesive masking tape are applied along the edges of the paper, with approximately half the width of the tape extending beyond the edge, to attach the paper to the surface to be covered. Large sheets of paper with tape thus attached are difficult and clumsy to handle, but more important is the problem of properly aligning the tape with the edge of the paper. A common difficulty is that of getting too much or too little of the width of the tape secured to the paper with the consequence that the taped edge, which is intended to be a straight guide edge, is wavy and irregular. Oftentimes the irregularities are so extreme that it is necessary to use one strip of tape applied either directly to the surface to be masked or over the strip secured to the paper, to obtain a suitably straight edge, resulting in a double expenditure of masking tape and an increase in labor and inconvenience for the operator. Often in an attempt to maintain a straight edge, the operator tends to make small folds in the masking tape in an effort to correct "run-outs" or "run-ons" of the tape relative to the edges of the paper. Under the influence of the high pressures of paint sprayers, these folds tend to open to allow paint to flow under the masking tape and cause irregularities at the edge of the area intended to be masked.

These problems are satisfactorily solved through the use of a novel masking tape, described in applicant's application Serial No. 518,787, now Patent No. 2,808,358, filed June 29, 1955, entitled "Masking Tape," consisting of two tapes, each having one adhesive surface, overlaid one on the other, with the adhesive surface of the other. The upper tape is wider than the under tape by the amount it is desired the tape should engage the masking paper, the entire underside of the composite tape thus presenting an adhesive surface. The narrower of the two tapes has a smooth backing surface, such as cellophane, so as to be relatively inactive to the pressure-sensitive adhesive coatings of conventional masking tapes, to which masking paper, on the other hand, adheres strongly. In use, the adhesive side of the composite tape is applied to a piece of masking paper, not necessarily along an edge, and both parts of the tape adhere tenaciously to the paper. Then starting at one end of the tape, the masking tape is separated, or stripped, from the cellophane-backed tape by pulling it upwardly and inwardly toward the inner edge of the cellophane-backed tape with the consequence, since both tapes strongly adhere to the paper, that the masking paper is cut, or sheared, along the edge of the cellophane-backed tape. That portion of the masking tape to which the cellophane-backed tape adheres is discarded, and the other portion, having the masking tape evenly attached along the straight edge which was cut during the stripping process, is ready for application to the surface to be masked.

While this method is very satisfactory, the composite tape, since it is of different thickness across its width, is difficult to handle in rolls, and if the masking paper is of a heavy weight, some difficulty is experienced in satisfactorily shearing the paper along the edge of the cellophane-backed tape. These disadvantages are overcome, and the advantages of the composite tape are retained, in one form of the present invention which contemplates coating an edge or strip of the masking paper with a material which is relatively inactive to the pressure-sensitive adhesives used on masking tapes, and perforating the masking paper along a line parallel to the edge of the paper and spaced inwardly therefrom a distance equal to the width it is desired the masking tape should extend beyond the edge of the paper. In use, a strip of masking tape, having an adhesive coating strongly adherent to uncoated masking paper, is applied to the paper with one edge aligned with the edge of the paper, the width of the masking tape being greater than the width of the perforated strip by the amount it is desired the tape should engage the masking paper. Then, the narrow coated strip of paper is separated, or stripped, from the masking tape by pulling it upward along the perforations with the consequence, since a portion of the width of the masking tape strongly adheres to the paper, that the main piece of masking paper has the masking tape evenly secured along and extending beyond the edge defined by the perforations, and is ready for application to the surface to be masked.

In another form of the invention, instead of the strip being taken from the sheet of masking paper, it may be formed of another material having a thickness comparable to that of the paper and provided with a low-adhesion coating or treatment to permit its easy removal from the adhesive coating of a masking tape. The material is formed into strips of appropriate width, the width it is desired that the tape extend beyond the edge of the masking paper. With the strip abutted along the edge of the masking material, a strip of masking tape, wider than the coated or treated strip is applied over the strip and masking paper with one edge thereof aligned with the outer edge of the strip. Then the strip is separated, or stripped, from the masking tape, leaving the tape evenly secured along and extending beyond the edge of the masking material an amount equal to the width of the strip. This form of the invention may be particularly useful with masking materials having low tensile strength, such as masking foils which might tear or break during removal from the tape even if provided with a low adhesion surface, or with very porous masking materials, such as blotter stock, on which it may be difficult to apply a surface having the necessary low-adhesion properties to be readily stripped from the tape.

Other features of the invention will be apparent, and a better understanding of its construction and utilization will be had from the following detailed description when considered with the accompanying drawing in which:

Fig. 1 is a fragmentary view of a masking paper embodying the invention;

Fig. 2 is a like view illustrating the manner of application of masking tape to masking paper embodying the invention;

Fig. 3 is a perspective view illustrating the manner in which the advantages of the invention are realized;

Figs. 4, 5 and 6 are fragmentary plan views illustrating variations of the invention; and Fig. 7 is a schematic representation of processing machinery for processing the masking paper of the invention.

Referring to the drawings, the masking paper of the invention is in all respects similar to papers now in use except that the sheet 10 is cut or perforated, as at 12, along a line parallel to and spaced from the edge of the sheet a distance equal to the width it is desired the masking tape should extend beyond the paper for a particular masking operation. For example, if masking tape one inch wide is to be used, with half the width extending beyond the edge of the paper, then the perforations would be spaced one-half inch from the edge of the sheet 10. Another difference is that the strip 14 defined by the cut or perforations 12 is treated or coated with a material which is incompatible (i.e., immiscible) with the adhesives employed on masking tapes so as to be inactive with respect to the adhesive, thereby not to unite so closely therewith that the treated strip cannot be readily stripped from the adhesive coating on the masking tape. The coating or treating may take a wide variety of forms and still achieve the objects of the invention. For example, the strip 14 may be treated with an oil, such as linseed oil, a cottonseed oil, or the like, which is inactive with the adhesives used on commercially available masking tapes to a degree that the tape adheres to the strip with sufficient tenacity to be rolled and handled together, yet not uniting as strongly therewith as does untreated paper so as to enable stripping of the treated strip from the adhesive.

Alternatively, the strip 14 may be coated with a glazing material of the type employed to produce papers with high gloss, or with a film of organic material which presents a smooth surface and which is substantially inert with respect to the adhesive properties of normally used masking tapes. A film of vinyl chloride resin, for example, consisting, for example, of copolymers, such as those of vinyl chloride with vinyl acetate, vinylidene chloride, and the like, may be coated on or impregnated in the paper 10 to provide a smooth and continuous surface on at least one side of the strip 14. Incidentally, it is unimportant to the operation if the other side of the strip is affected by the coating process. Another suitable low adhesion coating, described in U.S. Patent No. 2,607,711, may be formed of a polymer of an ester of the class consisting of high-alkyl acrylates and methacrylates wherein the high-alkyl radical has a length of 16 to 20 carbon atoms, and an acid of the class consisting of acrylic acid and methacrylic acid, the ester component of the component being in the proportion of about 40 to 80% by weight.

Although the masking tape may be and preferably is applied to the thus prepared masking paper during the processing of the paper (which will be described hereinafter), the novelty and utility of the invention will be explained by the simplified illustrations in Figs. 2 and 3. This is not to mean that the masking tape must be applied by machine, for the advantages of the invention are also attained by manual application of the masking tape. The masking tape 16, which may be of any available type, either cloth or paper backed and having an adhesive coating 18 on one surface thereof, such as, but not limited to, tape numbers 202, 209, 214, 215, 216, 221, 250, 255, respectively having ASTM adhesions of 26, 12, 31, 28, 32, 12, 41 and 12 distributed under the "Scotch" brand name by Minnesota Mining and Manufacutring Company, is applied to the edge of the paper 10 with the outer edge of the tape aligned with the edge of the paper with the adhesive surface directed toward the paper. The tape is sufficiently wider than strip 14 to engage a suitable area of the untreated paper, and from what has been said earlier, lightly adheres to strip 14 and strongly adheres to the paper 10. It should be noted that the manual alignment of the tape 16 with the edge of the paper does not present the problem described in the introduction where it is necessary to maintain an even extension of the tape beyond the edge of the paper.

To make the paper and tape ready to mask an area, starting at one end of the paper (the left in Fig. 3) the masking tape 16 is separated from the treated strip 14 by pulling the tape upwardly along the perforations 12, or if a wide sheet of paper 10 is involved, by stripping the treated strip 14 from the adhesive backing of tape 16. The strip 14 is discarded, leaving the sheet 10 with a straight edge, provided by the perforations, beyond which the tape 16 extends an amount equal to the width of strip 14. The remaining portion of the width of tape 16 continues to strongly adhere to paper 10, and the paper is then ready, having the tape evenly aligned along a straight edge, for attachment to the surface to be covered.

Fig. 4 illustrates a variation of the construction of Figs. 2 and 3 wherein the masking tape 22 is perforated or cut along a line 22 which traces a decorative design to divide the tape into two separable parts 20a and 20b. The cut 22 may be made on the tape 20 before its application to paper 10, or as a step in the processing of the paper with tape attached. The cut 22 is made in an area of the tape 20 which will overlay the treated strip 14 when the tape is aligned with the outer edge of the strip 14, whereby upon stripping treated strip 14 from tape 20, portion 20b of the tape is removed with it and discarded, leaving the portion 20a adhering to the edge of the paper to provide a decorative edge.

Fig. 5 illustrates another variation where instead of the treated strip 14 being along an edge of the paper it is applied along a line spaced from the edges of the paper, the treated strip thereby dividing the paper into two sections 10' and 10". The edges of the treated area are cut or perforated at 12' and 12" to permit easy removal of strip 14 from the main sheet of paper. This preparation of the paper lends itself to the placement of two strips of making tape 24 and 26 along the treated strip which may abut along a straight line 28, or along a line tracing a decorative design as shown in Fig. 4, with a portion of the width of the two tapes engaging the pieces of paper 10' and 10", respectively. It will be apparent that upon stripping the treated strip 14' from the tapes 24 and 26, two sheets of paper, i.e., 10' and 10", each with a tape, i.e., 24 and 26, accurately aligned along an edge thereof and presenting an adhesive surface for attachment to a surface to be covered, results. It will be appreciated that the two tapes 24 and 26, while shown abutting each other along line 28, may also have their opposing edges spaced from each other so long as a sufficient portion of the width of each to secure the paper to a surface, engages the treated strip 14'.

In addition to having utility on sheets or strips of masking paper as above-described, the invention may be useful in the preparation of preformed masks of a specific shape, such as letters, numerals, stencils, etc. For example, in Fig. 6 there is shown a piece of masking paper 30 pre-cut into the form of a T, and perforated along lines 32 parallel to the outer edges and spaced therefrom a distance by the amount it is desired the masking tape should extend beyond the edge. The strips 34 defined by the perforations are treated or coated as above-described to adhere only lightly to the adhesive coating of conventional masking tapes. Preparatory to use, pieces of tape, one being shown at 35, having a width greater than strips 34 are aligned with the edges of the form, and upon stripping of the strips 34 from the tape, there results a T with tape evenly aligned with and extending beyond its edges. In general, the patterns on which the invention can conveniently be used are limited to straight lines; however, certain crepe-backed masking tapes allow some flexibility with curves, or by using wide tape of the more conventional type, the tape may be die-cut to form curves along one edge.

While the tape may be manually applied to the masking paper of the invention, it may be convenient to prepare the paper and apply the tape thereto in a continuous process. Fig. 7 diagrammatically illustrates a satisfactory production layout for the production of the composite paper and tape product. In Fig. 7, a sheet 40 of masking paper of any suitable grade or composition is shown as being unwound from a roll 39, and after passing over an idler roller 41, is coated or treated along one edge (as in Fig. 1) or along a narrow line spaced from the edges of the sheet (as in Fig. 5) with a material incompatible with the adhesive coating on available masking tape, and may be applied as a solution from a bath 42 by a wiping roller 43. As discussed earlier, the bath may contain a suitable oil, such as linseed or cottonseed oil, a suitable vinyl chloride resin, or other material capable of forming a low-adhesion surface. The sheet with a strip thus treated then passes through a drier 44 where the treating material is conditioned to give a surface to be satisfactorily lightly adhesive to the adhesive coatings of masking tape. Thereafter, the sheet passes through a perforator 45 for making perforations along the edge of the paper (Fig. 1) or on either side of a coated strip (14' in Fig. 5).

A masking tape 50 is shown as being supplied from a roll 51, from which it passes over an idler roller 52 and feed roller 53 which engages the non-adhesive side of the tape. Feed rollers 53 cooperates with roller 54 to apply tape 50 to the coated strip on the sheet of masking paper 40, there being sufficient pressure between rollers 53 and 54 so as to cause strong adherence between the adhesive coating on the tape and the untreated paper and a relatively superficial adherence between the adhesive coating and the treated strip. When the tape 50 has been applied to the paper 40, the resulting product is rewound upon a roll 55, wherein the adhesive coating on the tape is protected by the paper, thereby enabling the sheet to be unwound freely from the roll. The masking paper with the masking tape applied may thus be marketed as an article of commerce, it being necessary for the user merely to unwind a suitable length and strip off the treated strip 14 (or 14') to have a mask, with tape attached, ready for application to the surface to be masked.

While Fig. 7 illustrates a suitable production set-up for the treatment of a single strip 14 (or 14') on a sheet of masking paper and the application of a single tape to the paper in alignment with the strip, it is to be understood that a plurality of "lines" such as the one shown may be distributed across a wide sheet of masking paper to provide for the simultaneous treatment of a plurality of strips and application of tapes thereto. For example, it may be desirable to treat a strip 14 on each edge of the sheet and apply masking tapes therealong, and to treat one or more strips 14' (as shown in Fig. 5) distributed across the sheet and apply two laterally abutting tapes to each such strips 14', whereby a number of masking strips may be had from a single length of the sheet.

Although the invention has been illustrated as embodied in a perforated strip of the masking material coated with a low adhesion material, this construction being preferred from the standpoint of ease of manufacture and handling, the strip may be completely severed from the masking material and/or formed of a material unlike the masking material without departing from the spirit of the invention. For example, in cases where the masking material has a low tensile strength, such as foils used for reflective insulation or decoration, coating a strip of the material would not be satisfactory inasmuch as it would likely tear or break during removal from the masking tape. Also, with porous masking materials, such as blotter or signboard stock, it may be difficult to apply a suitably low-adhesion surface to the material so as to be readily stripable from the adhesive of the masking tape. Even with such materials however, the advantages of the invention may be realized by forming the strip, comparable to strip 14 in the illustrated embodiment, of another material having a thickness comparable to that of the masking stock and of a composition to be readily coated with a low adhesion surface. The thus-prepared strip of appropriate width is abutted along an edge of the masking stock and the tape then aligned with the outer edge of the strip, the tape being sufficiently wider than the strip to engage the masking material by the desired amount. It will be appreciated that with the tape thus in place, the strip is in effect secured to and forms a part of the sheet of masking material and the assembly may be handled as a unit, rolled onto rolls, etc. If desired, a decorative edge, such as is shown in Fig. 4, may be cut in the masking tape after assembly as just described. When taken up for use, the strip is removed or stripped from the tape leaving the tape aligned with and extending beyond the edge of the masking material an amount equal to the width of the strip.

It will be understood that many changes in the size, form and method of production of the elements of the new product may be made and substituted for those herein shown without departing from the spirit of the invention. As indicated, the coating or treating of a removable strip may take a wide variety of forms, just so long as it is appreciably less adherent to the adhesive on the masking tape than is the masking material, and, of course, the masking tape itself may take a variety of forms, in respect to both adhesive coating and backings. For example, the tape backs may vary in composition, thickness, flexibility, resistance to moisture, or in any number of ways, depending on the particular application, and likewise, the pressure-sensitive adhesive may vary with the kind of tape and the use for which it was designed. Many adhesive coatings are known, ranging from strongly adhesive to very lightly adhesive, and may include certain rubbers, latex, resins or a combination of these with suitable solvents. The invention does not reside in the composition of the adhesive coating of the masking tape, or in the coating or treating material on strip 14, but rather in the provision of a strip adjacent to an edge of a piece of masking material, the strip having a surface less active to the adhesive coating on the masking tape used than to masking material. The strip itself may also take a variety of forms, as suggested above, while still realizing the advantages of the invention. Thus, while certain specific embodiments of the invention have been illustrated and described, it is to be understood that applicant does not wish to be limited thereto since many modifications are possible, and applicant, therefore, contemplates by the appended claims to cover all such modifications as fall within the true spirit and scope of the invention.

What is claimed is:

1. An article of manufacture comprising a sheet of masking material, a narrow strip of material of a thickness comparable to that of said masking material abutting an edge of said masking material along a perforated line, said strip having a surface inactive to the pressure-sensitive adhesive coatings of masking tapes to a degree permitting easy stripping of said strip from the adhesive coatings of such tapes, and a strip of masking tape having a pressure-sensitive adhesive coating overlaying and joined with said masking material and said surface of said strip in such lateral alignment with said perforated line that a portion of the width of said masking tape is joined to said strip and the remaining portion of the width of said masking tape is joined to said masking material.

2. The article of claim 1 wherein one edge of said masking tape is in register with the non-abutting edge of said strip.

3. As a new article of manufacture, a sheet of masking paper having a narrow strip thereof treated with a material to render said strip inactive to the pressure-sensitive adhesive coatings of masking tapes to a degree permitting easy stripping of said strip from the adhesive coatings of such tapes, said paper being perforated along said strip, and a strip of masking tape having a pressure-sensitive adhesive coating overlaying said paper in such lateral alignment with said perforations that a portion of the width of said masking tape is joined to at least a portion of the width of said treated strip and the remaining portion of the width of said masking tape is joined to untreated masking paper, the adhesive coating of said masking tape being joined to said treated strip and to the masking paper.

4. As a new article of manufacture, a sheet of masking paper having a narrow strip along an edge thereof treated with a material to render said strip inactive to the pressure-sensitive adhesive coatings of masking tapes to a degree permitting easy stripping of said strip from the adhesive coatings of such tapes, said paper being perforated along a line parallel to and spaced from the said edge of said sheet an amount equal to the width of said treated strip, and a strip of masking tape of a width greater than the width of said strip, and having a pressure-sensitive adhesive coating, overlaying said paper with one edge thereof aligned with the said edge of said paper, the adhesive coating of said masking tape being joined to said treated strip and to the masking paper.

5. As a new article of manufacture, a sheet of masking paper having a narrow strip thereof treated with a material to render said strip inactive to the pressure-sensitive adhesive coatings of masking tapes to a degree permitting easy stripping of said strip from the adhesive coatings of such tapes, said paper being perforated along parallel lines along the edges of said strip, and a strip of masking tape having a pressure-sensitive adhesive coating overlaying said paper in such lateral alignment with the perforations along one edge of said strip that a portion of the width of said masking tape is joined to a portion of the width of said treated strip and the remaining portion of the width of said masking tape is joined to untreated masking paper, the adhesive coating of said tape being joined to said treated strip and to the masking paper.

6. An article in accordance with claim 5 further including a second strip of masking tape having a pressure-sensitive adhesive coating overlaying said paper in such lateral alignment with the perforations along the other edge of said strip that a portion of the width of said second masking tape is joined to a portion of the width of said treated strip and the remaining portion of the width of said masking tape is adhesively joined to untreated masking paper.

7. The article of claim 6 wherein the opposing edges of said first and second strips of masking tape are abutting.

8. The article of claim 6 wherein the opposing edges of said first and second strips abut along an irregular line to provide a decorative edge along said first and second strips of masking tape upon removal of said treated strip.

References Cited in the file of this patent

UNITED STATES PATENTS

| Re. 19,128 | Drew | Apr. 3, 1934 |
| 1,827,636 | Ames | Oct. 13, 1931 |
| 2,246,984 | Palmer | June 24, 1941 |
| 2,264,295 | Carter | Dec. 2, 1941 |
| 2,278,673 | Savada | Apr. 7, 1942 |
| 2,307,406 | Howard | Jan. 5, 1943 |
| 2,438,828 | Sims | Mar. 30, 1948 |
| 2,603,899 | Leander | July 22, 1952 |
| 2,613,991 | Schindler | Oct. 14, 1952 |
| 2,808,358 | Masse | Oct. 1, 1957 |
| 2,817,596 | Schur | Dec. 24, 1957 |